(12) United States Patent
Neumann et al.

(10) Patent No.: US 11,377,318 B2
(45) Date of Patent: Jul. 5, 2022

(54) DEVICE FOR A ROLLER BODY OF A ROTATION ROLLER AND METHOD FOR MANUFACTURING THE DEVICE, PRINTING ROLLER ADAPTER AND PRINTING ROLLER

(71) Applicant: INOMETA GmbH, Herford (DE)

(72) Inventors: Olaf Neumann, Bielefeld (DE); Stephan Lorig, Legden (DE); Marc Wuensche, Detmold (DE); Michael Gaidetzka, Bad Salzuflen (DE)

(73) Assignee: INOMETA GMBH, Herford (DE)

( * ) Notice: Subject to any disclaimer, the term of this patent is extended or adjusted under 35 U.S.C. 154(b) by 260 days.

(21) Appl. No.: 16/654,415

(22) Filed: Oct. 16, 2019

(65) Prior Publication Data
US 2021/0047141 A1  Feb. 18, 2021

(30) Foreign Application Priority Data

Aug. 13, 2019 (DE) ...................... 10 2019 121 824.1

(51) Int. Cl.
*B65H 27/00* (2006.01)
*B41J 13/076* (2006.01)
*F16C 13/02* (2006.01)

(52) U.S. Cl.
CPC ............ *B65H 27/00* (2013.01); *B41J 13/076* (2013.01); *B65H 2404/117* (2013.01);
(Continued)

(58) Field of Classification Search
CPC ................ B65H 27/00; B65H 2404/10; B65H 2404/114; B65H 2404/117;
(Continued)

(56) References Cited

U.S. PATENT DOCUMENTS 4,062,098 A * 12/1977 Brugman ................ B65H 27/00
226/191
5,752,444 A * 5/1998 Lorig ..................... B41F 27/105
101/375
(Continued)

FOREIGN PATENT DOCUMENTS

DE         19520774 A1 * 12/1996 ........... G11B 23/113
DE         19939775 A1     3/2001
(Continued)

*Primary Examiner* — Jeremy R Severson
(74) *Attorney, Agent, or Firm* — Leason Ellis LLP (57) ABSTRACT

The invention concerns a device for a roller body of a rotation roller with an outer hollow body that has a cylindrical shape and is built with an internal cavity, an inner body that has a cylindrical shape and is arranged in an assembly with the outer hollow body in the internal cavity of the outer hollow body, and a centring device that is used during installation of the assembly to centrally position the inner body in the internal cavity; a relevant material bridge in the opposing end sections of the assembly, whereby the relevant material bridge is formed by a filler, which is applied and cured in a space at the end section of the assembly between an inner surface of the outer hollow body and an outer surface of the inner body, which is in contact with the inner surface of the outer hollow body and the outer surface of the inner body and is fully formed between this area and forms a dimensionally stable connection between the outer hollow body and the inner body in the assembly. Furthermore, a printing roller adapter, a printing roller and a process for the production of a device for a roller body of a rotation roller are also envisaged.

8 Claims, 7 Drawing Sheets

(52) U.S. Cl.
CPC ............. *B65H 2404/136* (2013.01); *B65H 2404/13421* (2013.01); *F16C 13/022* (2013.01)

(58) Field of Classification Search
CPC ...... B65H 2404/135; B65H 2404/1351; B65H 2404/18; B65H 2404/111; B65H 2404/1122; B65H 2404/13421; B65H 2404/17; B65H 2404/136; F16C 13/022; B41J 13/076
See application file for complete search history.

(56) References Cited

U.S. PATENT DOCUMENTS

2006/0124007 A1* 6/2006 Hoffmann ............... B41F 13/22
101/376
2010/0147171 A1 6/2010 Rossini

FOREIGN PATENT DOCUMENTS

| DE | 10016063 C2 | 8/2003 |
| DE | 102004026951 A1 | 12/2005 |
| DE | 102004026951 A1 | 12/2009 |
| FR | 2828436 A1 | 2/2003 |

\* cited by examiner

DEVICE FOR A ROLLER BODY OF A ROTATION ROLLER AND METHOD FOR MANUFACTURING THE DEVICE, PRINTING ROLLER ADAPTER AND PRINTING ROLLER

CROSS-REFERENCE TO RELATED APPLICATION

This application claims under 35 U.S.C. § 119(a) the benefit of German Patent Application No. 10 2019 121 824.1 filed Aug. 13, 2019, the entire contents of which are incorporated herein by reference.

FIELD

The disclosure refers to a device for a roller body of a rotation roller and the process for manufacturing this device. Further, a printing roller adapter and printing roller is referred to.

BACKGROUND

Rotation rollers are used in a wide range of applications. Examples of such applications include printing rollers, which are used in printing units or printing machines to print on a material. Rotation rollers regularly have a roller body with a cylindrical shape. Roller journals are arranged in an area where roller floors are opposite each other. These roller journals act as supports for the rotation roller in a machine.

Roller bodies or assemblies for roller bodies can be made up of several cylindrical bodies. There are designs in which an outer hollow body is fitted with an internal cavity, whereby an inner body in a cylindrical shape is positioned in the internal cavity. A centring device is used to ensure that the inner body is positioned centrally in the internal cavity. This centring device uses spacers to ensure that the inner hollow body remains at a sufficient distance from the inner surface of the outer hollow body.

Document US 2010/0 147 171 A1 discloses a highly stable adapter sleeve for printing cylinders. In relation to FIGS. 7 to 11 and the corresponding texts in particular, it demonstrates a body made up of multiple layers, namely an inner layer and an outer layer. Radial spacers maintain a stable distance between the inner and outer layers. The spacers are load bearing. FIG. 11 and the corresponding text shows that the spacers are provided with a ring-shaped groove to accommodate glue, so that the spacer can be firmly bonded to the inner surface of the outer layer.

Document DE 100 16 063 C2 describes a sleeve for printing rollers. In this document, a design with a dual-layer tube is envisaged. More specifically, this features an inner tube and an outer casing tube, which are held together via a glued bushing. As described in document US 2010/0 147 171 A1, the bushings are provided with a ring-shaped groove to improve the adhesive connection.

Document DE 10 2004 026 951 A1 refers a gravure cylinder. The document explains how a filling chamber between an outer tube and an inner tube is completely filled with polyurethane foam.

SUMMARY

It is an object to provide a device for a roller body of a rotating roller and a process for manufacturing this device, as well as a printing roller adapter and a printing roller. It is a further object to enable efficient arrangement and retention of an inner cylindrical body in the cavity of an outer cylindrical body, with a particular focus on the efficient use of materials and cost-effective production.

For solving the problem, a device for a roller body of a rotation roller and a method for manufacturing the device are provided. Furthermore, a printing roller adapter and a printing roller are provided. Embodiments are the subject of dependent claims.

According to an aspect, a device for a roller body of a rotation roller is provided, comprising: an outer hollow body having a cylindrical shape and comprising an internal cavity; an inner body having a cylindrical shape and provided in an assembly with the outer hollow body in the internal cavity of the outer hollow body; a centring device configured for centrally positing the inner body in the internal cavity during installation of the assembly; and a material bridge in opposing end sections of the assembly. For the material bridge the following is provided: the material bridge is formed by a filler material, which is applied and cured in a space at the end sections of the assembly between an inner surface of the outer hollow body and an outer surface of the inner body; the material bridge is provided in contact with the inner surface of the outer hollow body and the outer surface of the inner body; the material bridge is fully formed between the inner surface of the outer hollow body and the outer surface of the inner body; and the material bridge forms a dimensionally stable connection between the hollow body and the inner body in the assembly.

According to another aspect, a method for manufacturing a device for a roller body of a rotation roller, comprising: providing an outer hollow body having a cylindrical shape and comprising an internal cavity; providing an inner body having a cylindrical shape; producing an assembly in which the inner body is positioned in the internal cavity of the outer hollow body, whereby a centring device comprising a spacer is applied for arranging the inner body in the internal cavity in a position providing a distance between the inner body and the outer hollow body; and producing a material bridge in opposing end sections of the assembly. For the material bridge the following is provided: the material bridge is formed by a filler material, which is applied and cured in a space at the end sections of the assembly between an inner surface of the outer hollow body and an outer surface of the inner body; the material bridge is provided in contact with the inner surface of the outer hollow body and the outer surface of the inner body; the material bridge is fully formed between the inner surface of the outer hollow body and the outer surface of the inner body; and the material bridge forms a dimensionally stable connection between the hollow body and the inner body in the assembly.

Others aspects refer to producing of a printing roller adapter with the device for a roller body of a rotation roller, as well as a printing roller with the printing roller adapter and a printing sleeve that is joined to the printing roller adapter by means of a detachable connection, used for applications such as a printing roller for a rotary printing machine.

The centring device is used to position the inner body in the internal cavity of the outer body before the filler (material) is introduced, for example as a casting compound. After the curing process, torque and forces occurring during operation are (primarily) transferred between the outer hollow body and the inner body via the material bridges made from the cured filler. The spacer(s) can also contribute to this depending on the specific design.

The spacer(s) of the centring device can form a tundish for the introduction of the filler. The cured filler and the material bridges that it forms—which extend fully between the inner surface of the outer hollow body and the outer surface of the inner body—form a supportive, load-bearing and rigid structure in the assembly.

The combination of the centring device and the material bridges in the opposing end sections supports the mechanical stability of the assembly, particularly in terms of rigidity and/or compressive strength.

One or more spacers can be used. In the case of three or more spacers, spacers that are arranged next to each other can use the same distance or different distances.

The spacers can be made from metal or a plastic material, which can be fibre-reinforced.

Adhesives, resin systems or other non-metal, thermosetting materials can be used as a filler material. Fusible metal alloys or other metallic materials can also be used. The filler can consist of a thermosetting base material and an added filler material, such as filling particles.

Direct contact surfaces between the spacer(s) on one side and the inner body and/or the outer body on the other side can be free from filler.

The inner body can be designed as a hollow body with an internal cavity to house the shaft with journal extensions at opposing sides. It can also be designed in such a way that the journal extensions at the end sections are formed around the inner body in one piece. The opposing sides of the assembly with the outer hollow space and the inner body can be designed with a base.

The filler material may be elastically deformable. In this design, the filler deforms elastically in response to compressive stress. For example, an elastomer, such as a polyurethane elastomer, can be used as a filler or casting compound.

The filler material may be a solid material after curing. The filler (material) can be rigid. In such embodiment, the filler cannot be not deformed elastically. For example, a vinylester-based electro casting compound can be used, or Duramer casting compound.

The centring device may comprise a spacer provided in a side end section of the assembly in the space. The centring device may comprise one or more spacers provided in an end section at the side of the assembly in the space. The centring device can be designed with a spacer in both side end sections of the assembly, whereby the spacer is positioned in the space between the outer hollow body and the inner body in order to position these relative to one another (centre), with a focus on ensuring that they are rotationally symmetrical, so that the filler can be introduced and form the complete material bridges.

The filler material can at least partially fill a cavity of the spacer. The filler may fill the majority of the cavity/cavities in at least one spacer.

The material bridge can be extending through a cavity or opening of the spacer. The design may comprise a plurality of material bridges, each of which covers the full length between the inner surface of the outer hollow body and the outer surface of the inner body. The material bridges can all be formed outside of the spacer(s), for example, on opposing sides of the spacer.

The material bridge(s) may be formed outside the spacer in the opposing end sections, for example next to the spacer, either in contact with this or not. All material bridges can be formed outside of the spacer(s). A material bridge can be arranged between neighbouring spacers.

One or more spacers can be designed in multiple layers.

The material bridges can be protruding or extending through openings in the wall of the spacer, whereby the openings of the inner surface of the outer hollow body and the outer surface of the inner body are arranged opposite each other. In an embodiment, the spacer has radial, separately formed openings, for example round or square openings. The material bridge(s) is/are formed all the way through at least part of these openings.

The material bridge can be provided as a continuous circumferential design or construction. Alternatively, the material bridge can be formed in a circumferential design at spaced intervals, for example by designing the spacer with radially arranged, separated openings.

End wall closures of the space can be formed by the filler material and/or the wall of the spacers.

The space between the inner surface of the outer hollow body and the outer surface of the inner body can be at least partially filled with a non-load-bearing material. Non-load-bearing materials are materials that are not able to remain rigid when subjected to the usual load that occur during operation or a process, for example a soft foam.

Spacers at the edge can be arranged in the area of opposing end sections of the assembly with the outer hollow body and the inner body. For the assembly with the outer hollow body and inner hollow body, the opposing end faces of the spacers at the edge can be designed so that they at least partially form a base. Alternatively, or in addition, one or more spacers on the centring device can be arranged at a distance from the edge, for example in a central area of the device.

The spacers can be radially arranged around the inner body. The spacers can be arranged in a radially continuous or radially interrupted design. In one design, the spacer can be arranged so that it has circumferential contact with the inner body at spaced intervals, while the circumferential contact area of the spacer in contact with the inner side of the outer hollow body is continuous. This design could also be constructed the opposite way, i.e. continuous circumferential contact with inner body and contact with outer body at spaced intervals.

The filler can fill an area of the intermediate space between the outer hollow body and the inner body that is next to the spacer. This can be caused by the filler overflowing and spilling out of the cavities of the spacer into the intermediate space, for example. In one design, the filling of the space with the filler outside of the spacer can be limited to an area directly next to the spacer.

At least one spacer can be provided with a channel structure, which is set up to convey a pressurised fluid, such as air, into a space between the outer hollow body and inner body from outside of the assembly with the outer hollow body and inner body. In contrast to other cavities in the spacers, the channels of the channel structure are not filled with filler when it is introduced, at least not fully filled. This means that the pressurised fluid can flow through the channels. In the spacers, several channel sections can be arranged circumferentially along the inner body at intervals. At least one of the spacers can be designed with a connection to let the fluid into the channel structure, for example in the area of a front surface or side surface. The space between the outer hollow body and the inner hollow body can be designed so that it goes around the circumference of the inner body. Thanks to the channel structure in the spacer(s), the device can be set up or prepared for a roller body that is used in a rotation roller which uses sleeve technology. Here, it is envisaged to fit or disassemble printing sleeves on the sleeve or adapter using the pressurised fluid, especially air. This fluid is used to create an air cushion between the printing sleeve and the adapter, in order to mount or disassemble the printing sleeve. Sleeve technology is known as such in a wide range of versions. The wall of the outer hollow body can be designed with openings or recesses for this purpose, to enable the fluid to flow out. These openings or recesses are in contact with the space and the channel structure.

The channel can, at least partially, be constructed in a similar throughout the material bridge.

The channel structure can form a loop around the circumferential outer surface of the spacer(s). The loop can be designed with an open channel, which can have a U-shaped or V-shaped channel cross-section, for example. When the circumferential outer surface of the spacer is in contact with the inner surface of the outer hollow body, the spacer and the outer hollow body form the wall of the loop together. In this design or other designs, the inner surface of the spacer, which is facing the inner body, can be arranged around the circumference of the inner body, either continuously or at intervals.

The channel structure can be designed with a channel section with an angular cross-section. The angular cross-section can be triangular or square, for example, or even in a rhombus shape. Alternatively, or in addition to this, a channel can also have a round cross-section.

The spacer elements of the centring device can be designed as one component with integrally designed partition walls and at least partially enclosed cavities can be formed from these. In this design or other designs, part of the cavities in the spacer(s) can be designed as cavities that are open on the outside. A combination of open and closed cavities can be used.

The spacers can be components made via additive manufacturing. One or several of the spacers can be produced using an additive manufacturing process, such as 3D printing. The enables the centring device with spacers to be produced with different cavity designs in a cost-effective and simple way. The wall thickness of the spacers can also be individually adjusted when using this type of manufacturing process. Different types of additive manufacturing processes for different materials are recognised under the terms additive manufacturing.

The previously described designs relating to the device for a roller body of a rotating body can be envisaged in conjunction with the process for manufacturing.

In the case of the printing roller adapter for the roller body, the printing roller adapter can be designed as an adapter for flexographic printing, offset printing, rotogravure printing or digital printing. For such applications or other applications, printing roller adapters are also referred to as sleeves. The printing roller adapter can be designed as an anilox sleeve or as a flexographic printing sleeve. In the case of flexographic printing, a direct high-pressure process is used in which flexible printing plates (printing sleeves) made of photopolymer or rubber are used on adapters or sleeves. Flexographic printing is used to print on a wide range of materials that cannot be printed on or only printed on to a limited extent using other printing processes, such as films, paper, cardboard etc.

DESCRIPTION OF EMBODIMENTS

Following, additional embodiments will be explained in more detail with reference to figures. In the figures, show.

Figure 1:
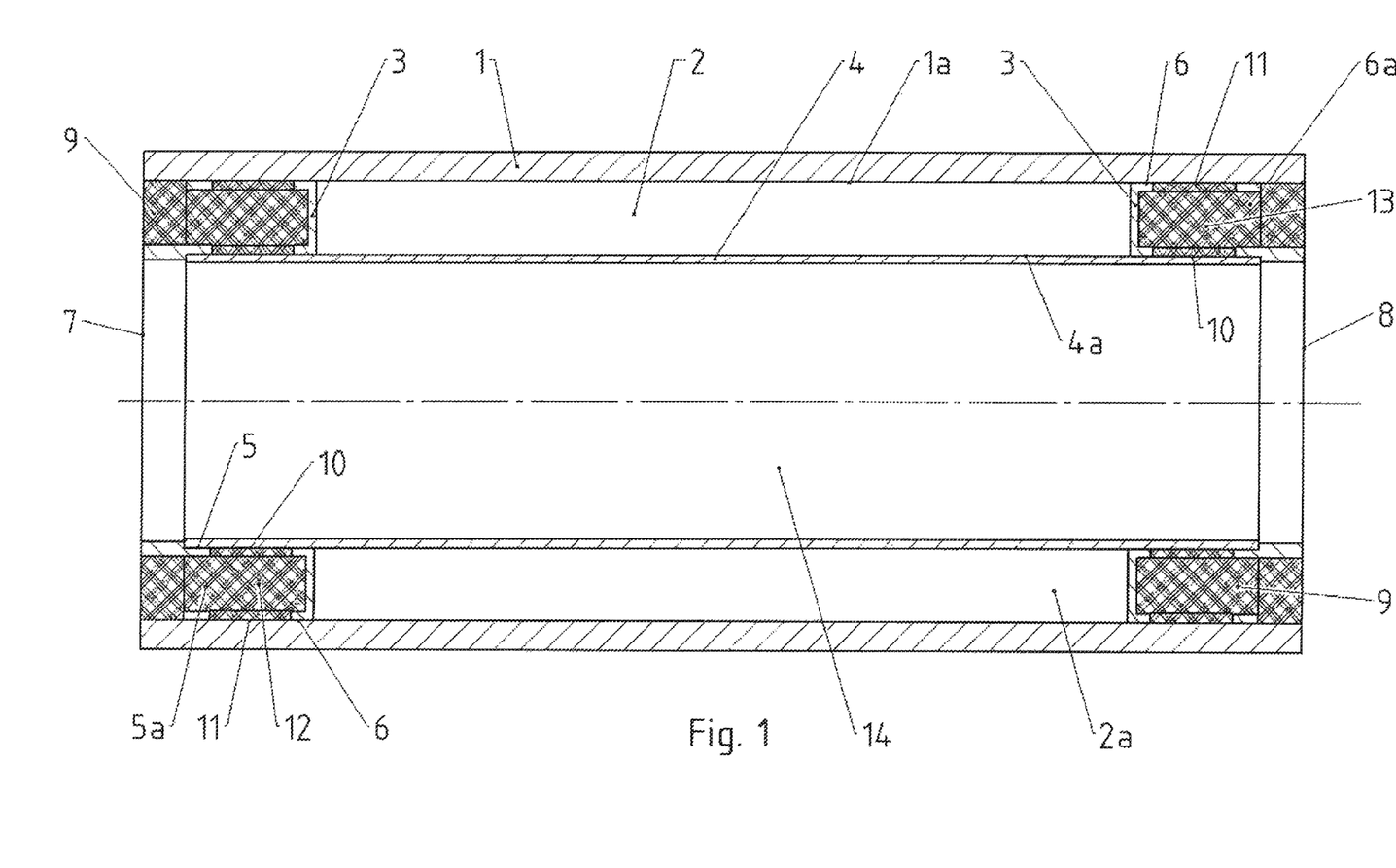
FIG. 1 a schematic cross-sectional view of a device for a roller body of a rotation roller.
Figure 2:
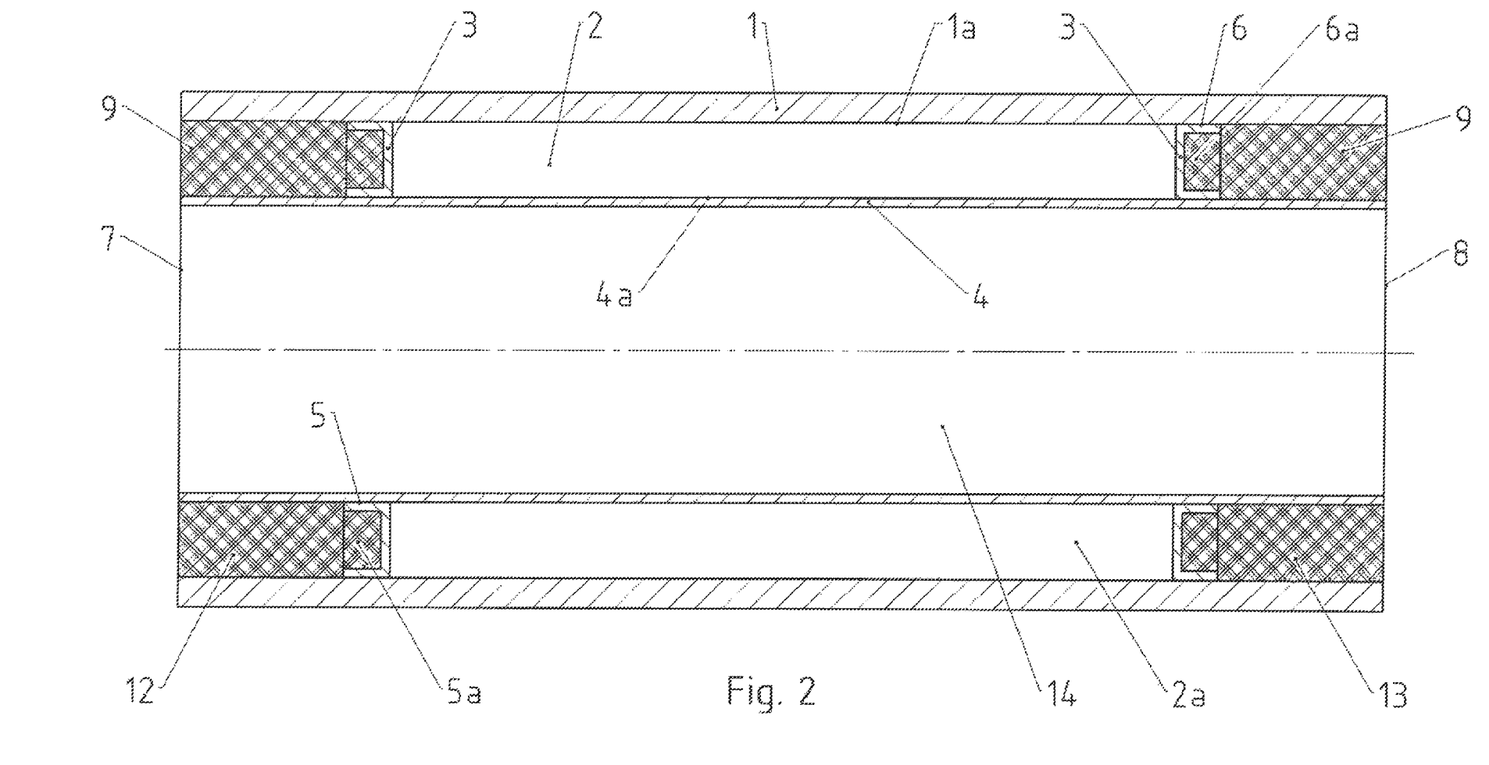
FIG. 2 a schematic cross-sectional view of another device for a roller body of a rotation roller.
Figure 3:
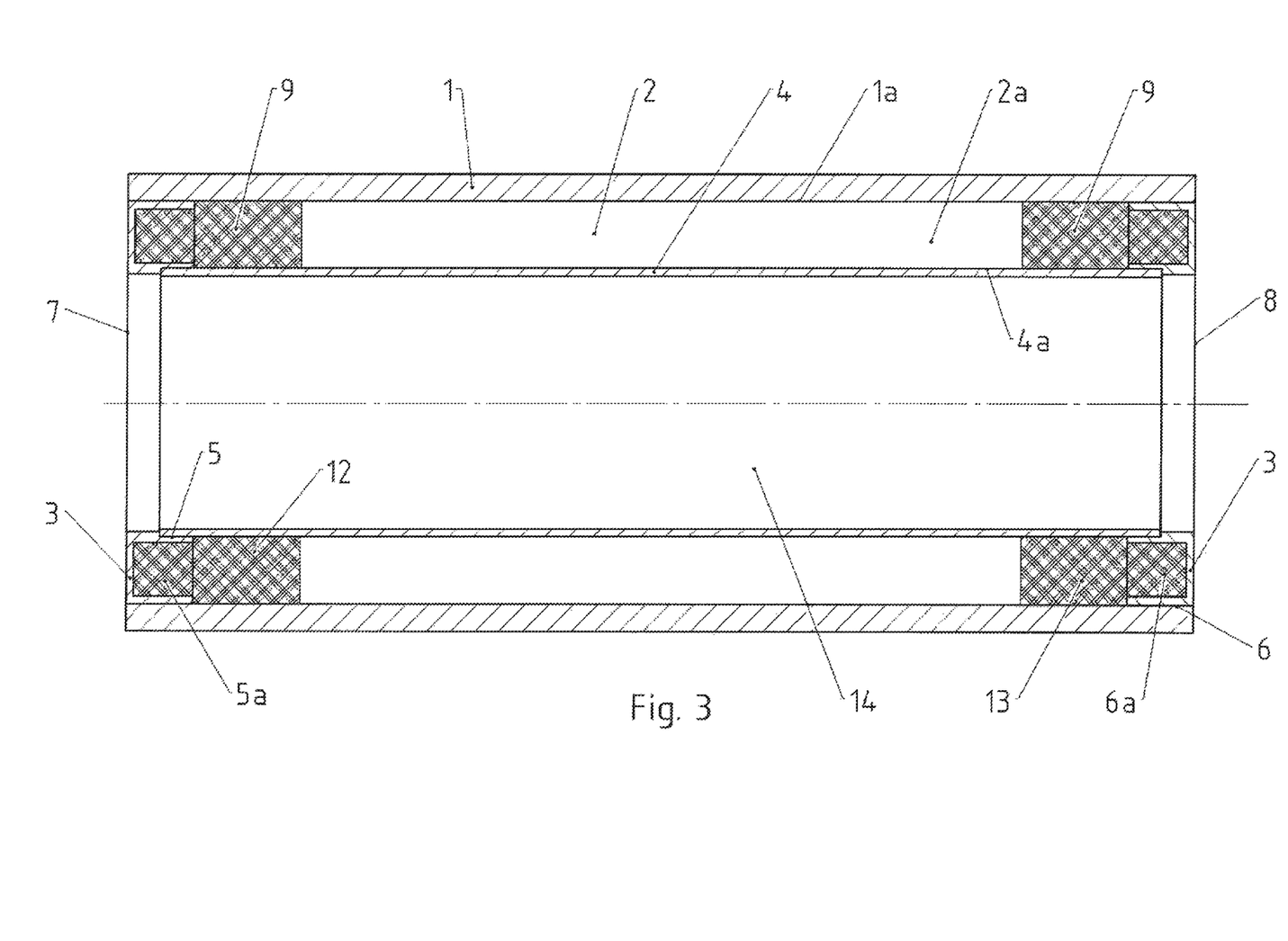
FIG. 3 a schematic cross-sectional view of another device for a roller body of a rotation roller.
Figure 4:
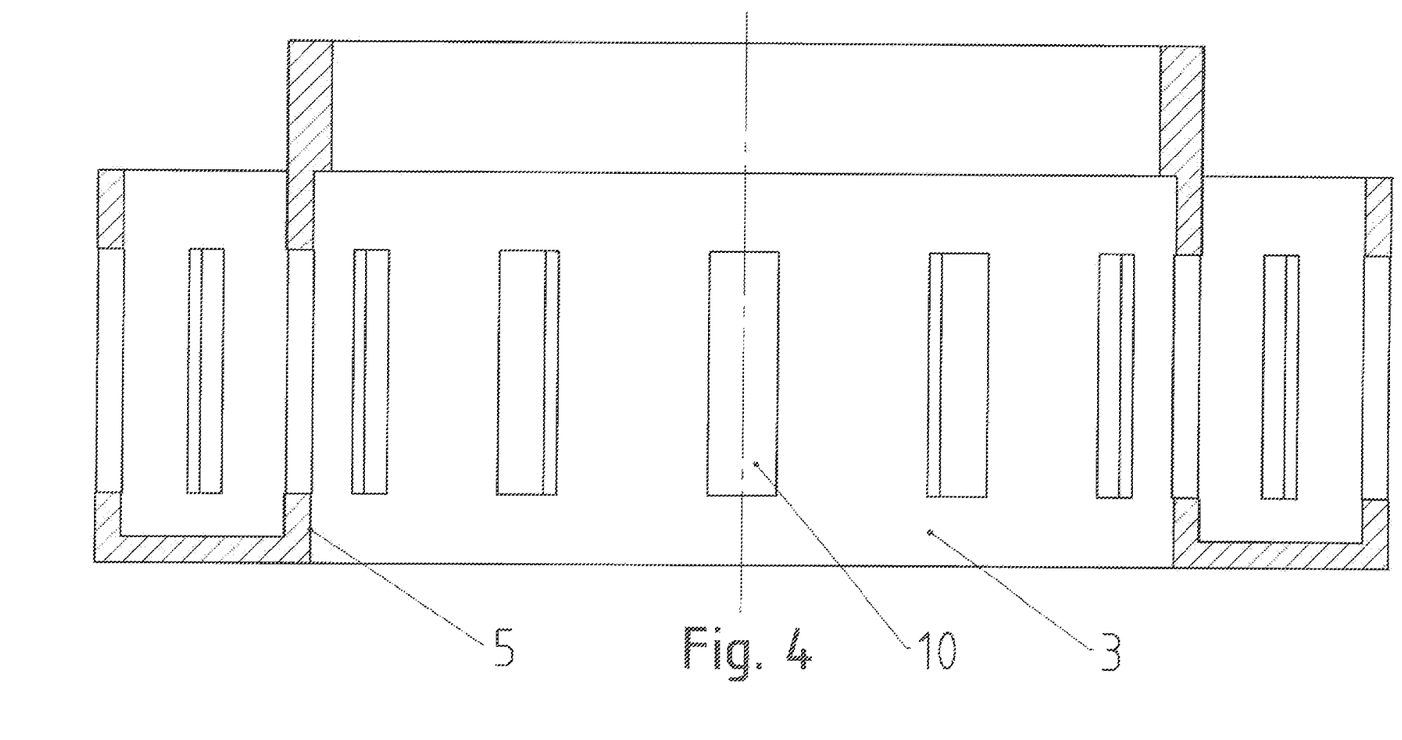
FIG. 4 a schematic cross-sectional view of an assembly with a spacer of a centring device.
Figure 5:
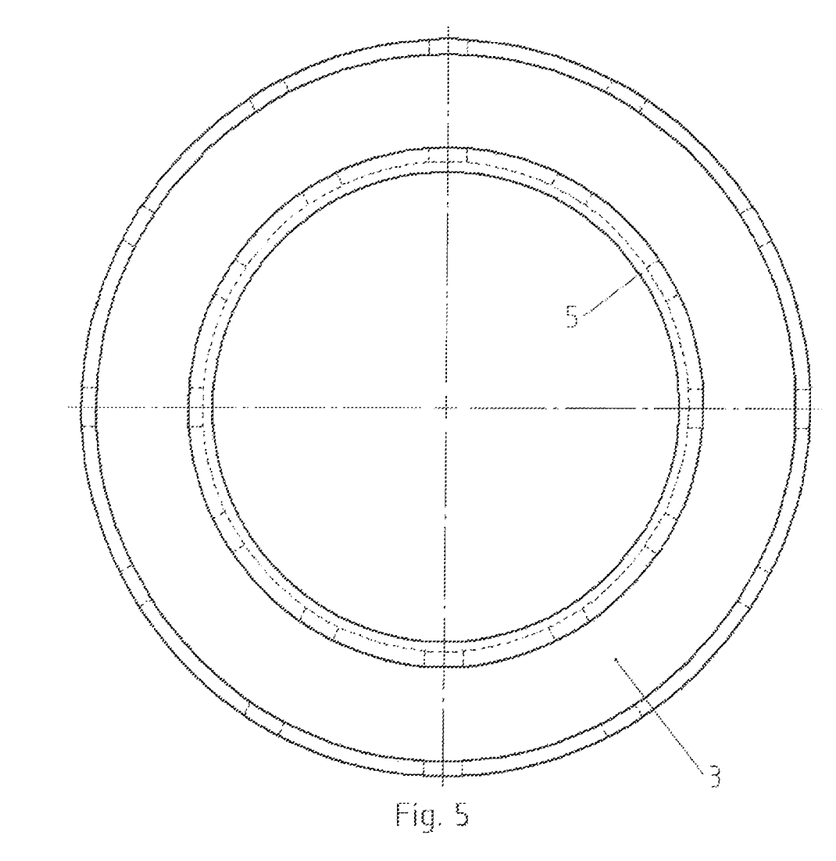
FIG. 5 a schematic view of the assembly from FIG. 4 from the front.
Figure 6:
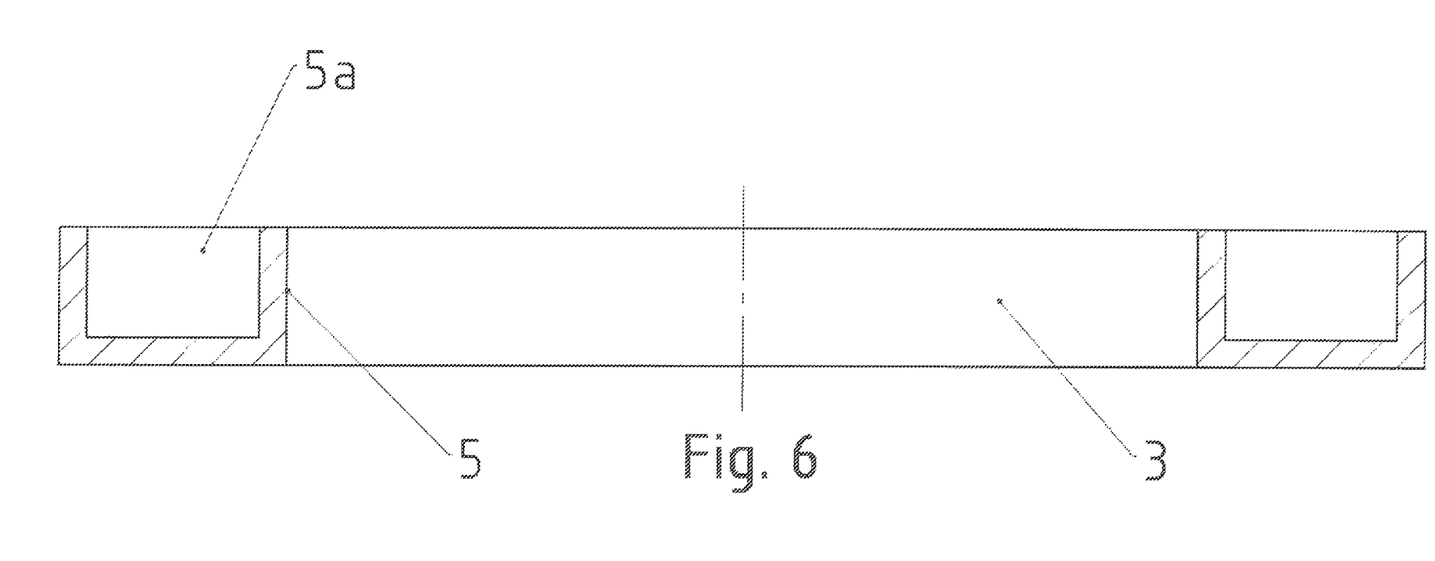
FIG. 6 a schematic cross-sectional view of a spacer for a centring device.
Figure 7:
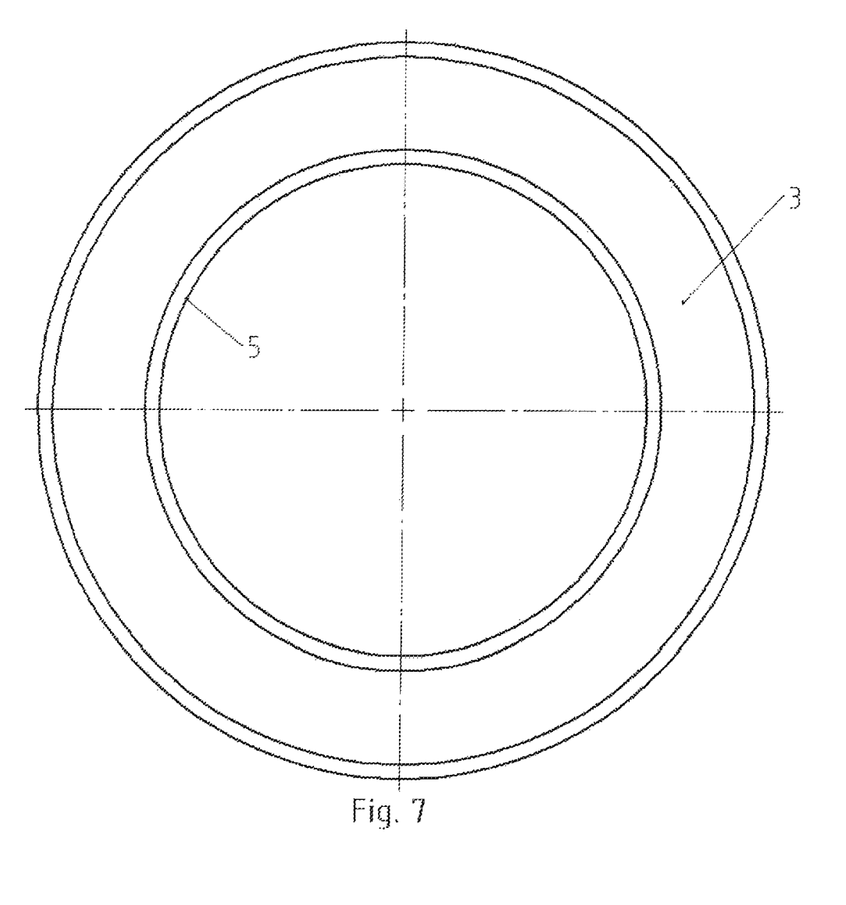
FIG. 7 a schematic view of the spacer from FIG. 6 from the front.

FIGS. 1 to 3 each show a schematic cross-sectional view of a device for a roller body of a rotation roller, with particular regard to a printing roller. The device can be used to provide a roller adapter (sleeve) for a printing roller.

The device in FIG. 1 features an outer hollow body 1 with a cylindrical shape. The outer body 1 has an internal cavity 2, in which an inner body 4 is positioned and held in place by means of a centring device 3. In the design example shown here, the inner body is also designed as a hollow body. During assembly, the inner body 4 is positioned inside the internal cavity 2 using the spacers 5, 6 of the centring device 3. In the design shown here, the internal cavity is arranged at opposing end sections 7, 8. This creates an intermediate space 2a between an inner surface 1a of the outer hollow body 1 and an outer surface 4a of the inner body 4.

The spacers 5, 6 each have a cavity 5a, 6a. In the design examples shown here, this cavity is filled with a filler 9 after the outer hollow body 1 and the inner body 4 have been positioned relative to one another using the centring device 3. The filler can be applied as a casting compound, for example. In alternative designs (not shown), the filler can be arranged in the intermediate space 2a completely outside of the cavity 5a, 6a.

A material bridge 12, 13 made of the filler 9 is formed through openings 10, 11 in the spacers 5, 6 on opposing sides. The material bridge extends all the way between the inner surface 1a of the outer hollow body 1 and the outer surface 4a of the inner body 4 and is fully in contact with these surfaces through the openings 10, 11. Forces and torques are transferred between the outer hollow body 1 and the inner body 4 via the material bridges 12, 13 during operation.

In other configurations, the spacers 5, 6 can be designed with multiple cavities, which can then be at least partially filled with the filler 9, which cures after it has been introduced.

Provided that it has not already been filled in by the spacers 5, 6 and the filler 9, the rest of the intermediate space 2a can be filled with a non-load-bearing filler.

When assembling the inner body 4 in the internal cavity 2 of the outer hollow body 1, the spacer 5 is inserted first and then a dedicated end section of the inner body 4 is lined up with the spacer 5. This process results in the formation of the intermediate space 2a. Then the spacer 6 can be assembled, and the filler 9 is added on to this. Another assembly sequence is also possible.

The filling process for the filler 9 can be limited to the cavity/cavities 5a, 6a of the spacer 5, 6. Alternatively, or in addition to this, the filler 9 can protrude out of the spacers 5, 6.

In the example shown here, the cavity/cavities 6a of the spacer 6 are filled with the filler 9, whereby the fluid or paste-like filler (casting compound) then cures to create the required mechanical stability for transmission of forces between the inner body 4 and the outer hollow body 1. If the spacers 5, 6 are (partially) surrounded by filler 9, this can enhance mechanical stability.

An inner space 14 inside the inner body 4 can be used as a holding fixture for a shaft, which can then also be used to provide roller journals (not shown) for the rotation roller.

FIGS. 2 and 3 show additional devices 1 for a roller body of a rotation roller. The same reference numbers are used for the same features.

FIGS. 4 and 5 and FIGS. 6 and 7 each show a schematic cross-sectional view of a spacer and a view from the front.

In the embodiments shown here, the spacer 5 grips the inner body 4 all the way round.

Channels (not shown) are part of a channel structure that can be formed in the spacer to let in or feed pressurised fluid from outside via a connection, so that the pressurised fluid can reach the intermediate space 2a and then pass through openings or recesses (not shown) to reach the outer hollow body 1. The channels are connected to an external loop. A connecting cable can be coupled with the connection to introduce the pressurised fluid, e.g. air.

With the channel structure in the spacer(s), the device is set up for the sleeve technology, in which printing sleeves that are to be mounted or disassembled on the outer hollow body 1 are mounted/disassembled using the pressurised fluid. Different versions of this technology are referred to as sleeve technology.

After the filler and binding compound 9 have cured, all components are connected and held in position.

Different 3D printing technologies can be used to produce the spacers 5, 6 of the centring device 3. In terms of cost-effectiveness, the Fused Filament Fabrication (FFF) process is particularly well suited to this task. During this process, a thermoplastic filament is melted in a nozzles and deposited one layer at a time on a platform in a machine-controlled process.

Both metallic materials and plastics can be used as the starting material for the additive manufacturing of the spacers 5, 6. The plastics that can be used include polyactic acid (PLA), acrylonitrile butadiene styrene (ABS), polycarbonate (PC), polyamide (PA) and high-impact polystyrene (HIPS), as well as compounds of these materials and high-performance plastics such Polyether ether ketone (PEEK) or Polyaryletherketone (PAEK).

Furthermore, the spacers 5, 6 can also be produced from recycled material or a mixture or materials with or without short and long fibres. On the one hand, this enables a dimensionally stable, more resilient printed centring device, and on the other hand, it enables the reconditioning of industrial thermoplastic waste. The recycling of industrial waste promotes environmental protection and helps to spare environmental resources.

The combination of spacers 5, 6 produced using additive manufacturing processes and a thermosetting filler and binding compound 9 results in a weight saving in comparison to mechanical components that are machined out of metal. This aspect promotes the concept of lightweight design and also results in improved handling of the overall product at the end customer's premises.

In addition to a weight saving, the use of new technologies can also enable more cost-effective processes in single series and small series production. In the case of 3D printing, the cost-intensive tooling of lathes and milling machines is eliminated, along with the production of technical drawings, as the component is produced using predominantly digital methods. Injection moulding can be used to produce large quantities quickly and in a cost-effective way, which provides optimal conditions for series production.

A non-metal, thermosetting material or a metal, fluid material is used as a filler and binding compound 9. This compound binds the centring device and all other components together thanks to its adhesive and cohesive properties. The fillers and binding compounds include glues, resin systems and other non-metal, thermosetting materials, as well as high-grade, particle-filled and fusible metal alloys.

The rotationally symmetrical component is aligned precisely with the rotationally symmetrical component using the centring device, which is produced using an additive manufacturing process or injection moulding. Metal parts etc. are also positioned concentrically via the centring device.

A channel structure (not shown) in the spacers 5, 6 that can be freely designed as part of an additive manufacturing process is used as an intake for the pressurised flow medium, which is then conveyed on to the surrounding intermediate space (channel [2a]). In the spacer 5, 6, at least one circumferential channel can ensure even distribution of the pressurised flow medium within the channel. For the conveyance or intake of the pressurised flow medium within the circulating channel, there is at least one connection option for a line made of rubber, plastic or metal.

The features mentioned in one of the preceding specification, the claims and the drawing can be of importance on their own or in any combination for the implementations of the different embodiments.

The invention claimed is:

1. A device for a roller body of a rotation roller, comprising:
   an outer hollow body having a cylindrical shape and comprising an internal cavity;
   an inner body having a cylindrical shape and provided in an assembly with the outer hollow body in the internal cavity of the outer hollow body;
   a centering device configured for centrally positing the inner body in the internal cavity during installation of the assembly, wherein the centering device comprises a spacer; and
   a material bridge in opposing end sections of the assembly, wherein for the material bridge the following is provided:
      the material bridge is formed by a filler material, which is applied and cured in a space at the end sections of the assembly between an inner surface of the outer hollow body and an outer surface of the inner body, wherein the spacer is provided in a side end section of the assembly in the space and wherein the filler material at least partially fills in a cavity of the spacer;
      the material bridge is extending through the cavity of the spacer;
      the material bridge is extending through openings in a wall of the spacer, whereby the openings on the inner surface of the outer hollow body and on the outer surface of the inner body are arranged opposite each other;
      the material bridge is provided in contact with the inner surface of the outer hollow body and the outer surface of the inner body;
      the material bridge is fully formed between the inner surface of the outer hollow body and the outer surface of the inner body; and the material bridge forms a dimensionally stable connection between the hollow body and the inner body in the assembly.

2. The device of claim 1, wherein the filler material is elastically deformable.

3. The device of claim 1, wherein the filler material is a solid material after curing.

4. The device of claim 1, wherein the material bridge is having a continuous circumferential construction.

5. The device of claim 1, wherein end wall closures of the space are formed by the filler material and / or the wall of the spacers.

6. The device of claim 1, wherein the space between the inner surface of the outer hollow body and the outer surface of the inner body is at least partially filled with a non-load-bearing material.

7. A printing roller adapter, comprising:
   an outer hollow body having a cylindrical shape and comprising an internal cavity;
   an inner body having a cylindrical shape and provided in an assembly with the outer hollow body in the internal cavity of the outer hollow body;
   a centering device configured for centrally positing the inner body in the internal cavity during installation of the assembly, wherein the centering device comprises a spacer; and
   a material bridge in opposing end sections of the assembly, wherein for the material bridge the following is provided:
      the material bridge is formed by a filler material, which is applied and cured in a space at the end sections of the assembly between an inner surface of the outer hollow body and an outer surface of the inner body, wherein the spacer is provided in a side end section of the assembly in the space and wherein the filler material at least partially fills in a cavity of the spacer;
      the material bridge is extending through the cavity of the spacer;
      the material bridge is extending through openings in a wall of the spacer, whereby the openings on the inner surface of the outer hollow body and on the outer surface of the inner body are arranged opposite each other;
      the material bridge is provided in contact with the inner surface of the outer hollow body and the outer surface of the inner body;
      the material bridge is fully formed between the inner surface of the outer hollow body and the outer surface of the inner body; and
      the material bridge forms a dimensionally stable connection between the hollow body and the inner body in the assembly.

8. A method for manufacturing a device for a roller body of a rotation roller, comprising:
   providing an outer hollow body having a cylindrical shape and comprising an internal cavity;
   providing an inner body having a cylindrical shape;
   producing an assembly in which the inner body is positioned in the internal cavity of the outer hollow body, whereby a centering device comprising a spacer is applied for arranging the inner body in the internal cavity in a position providing a distance between the inner body and the outer hollow body; and
   producing a material bridge in opposing end sections of the assembly, wherein producing the material bridge comprises:
      forming the material bridge by a filler material, which is applied and cured in a space at the end sections of the assembly between an inner surface of the outer hollow body and an outer surface of the inner body, wherein the spacer is provided in a side end section of the assembly in the space and wherein the filler material at least partially fills in a cavity of the spacer;
   wherein the material bridge extends through the cavity of the spacer;
   wherein the material bridge extends through openings in a wall of the spacer, whereby the openings on the inner surface of the outer hollow body and on the outer surface of the inner body are arranged opposite each other;
   wherein the material bridge contacts the inner surface of the outer hollow body and the outer surface of the inner body;
   wherein the material bridge is fully formed between the inner surface of the outer hollow body and the outer surface of the inner body; and
   wherein the material bridge forms a dimensionally stable connection between the hollow body and the inner body in the assembly.

\* \* \* \* \*